(12) United States Patent  
Choi

(10) Patent No.: US 6,961,050 B2  
(45) Date of Patent: Nov. 1, 2005

(54) APPARATUS AND METHOD FOR PREVENTING NOISE OF TOUCH SCREEN

(75) Inventor: Hyun-seok Choi, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 296 days.

(21) Appl. No.: 10/367,861

(22) Filed: Feb. 19, 2003

(65) Prior Publication Data

US 2004/0100450 A1 May 27, 2004

(30) Foreign Application Priority Data

Nov. 21, 2002 (KR) ...................... 10-2002-0072694

(51) Int. Cl.[7] .............................................. G09G 5/00
(52) U.S. Cl. ........................ 345/173; 345/173; 345/174
(58) Field of Search ................................ 345/173–175

(56) References Cited

U.S. PATENT DOCUMENTS 5,410,329 A * 4/1995 Tagawa et al. ............. 345/104
5,896,120 A * 4/1999 Iguchi et al. ................ 345/102
2002/0089491 A1 * 7/2002 Willig ......................... 345/173

* cited by examiner

Primary Examiner—Jimmy H. Nguyen  
Assistant Examiner—Steven Holton  
(74) Attorney, Agent, or Firm—Sughrue Mion, PLLC

(57) ABSTRACT

An apparatus and method for preventing noise in a touch screen using a predetermined number of gates that substantially eliminates noise in advance and reduces cost includes an analog-to-digital converter (ADC) which converts received analog source data into digital source data, and sends the converted data. An input detection signal generator generates and sends an input detection signal containing information on a period from when the ADC receives analog source data to when the ADC finishes the conversion. A noise-preventing clock generator receives the input detection signal, generates a predetermined clock signal, and by referring to the information on the period contained in the received input detection signal, during the period from when analog source data is received to when the conversion is finished, disabling the generated clock signal and sending the clock signal. During the remaining period, the disabling is released and the clock signal is sent.

42 Claims, 6 Drawing Sheets

FIG. 7
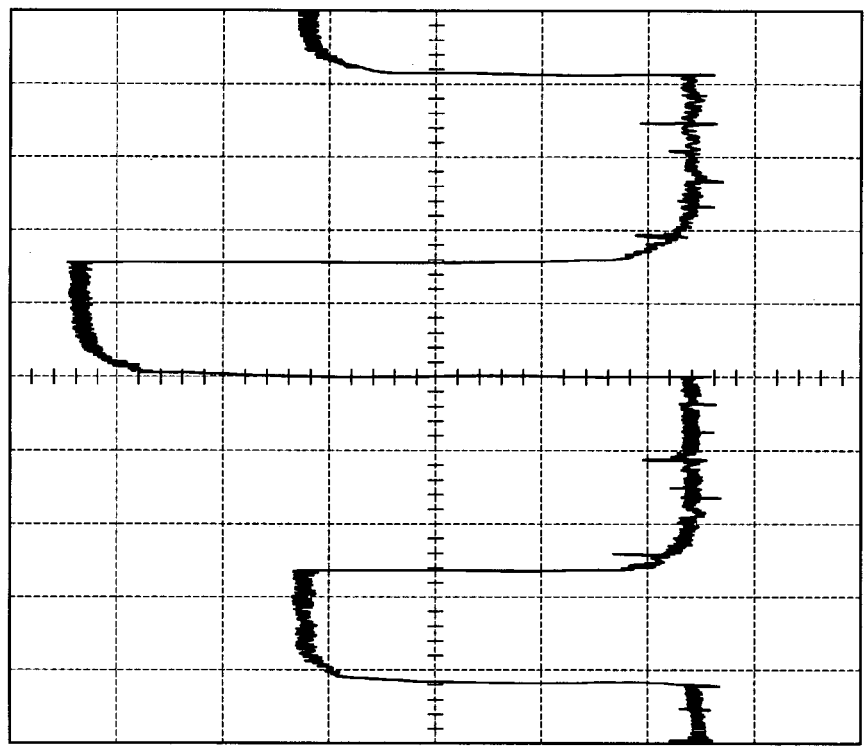
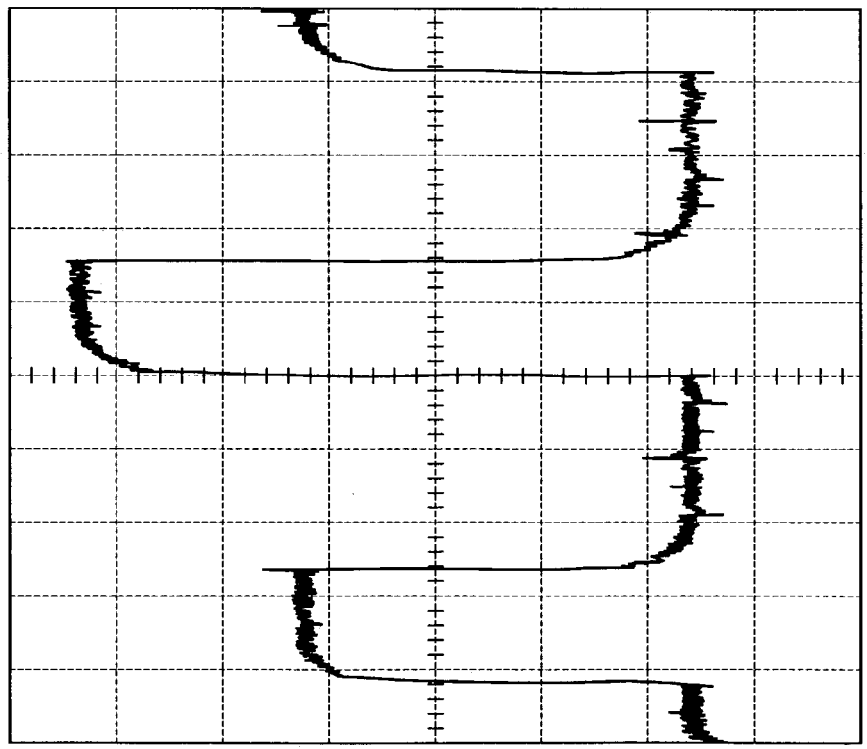

APPARATUS AND METHOD FOR PREVENTING NOISE OF TOUCH SCREEN

BACKGROUND OF THE INVENTION

1. Field of the Invention

The present invention relates to an apparatus and method for preventing noise, and more particularly, to an apparatus and method for preventing noise in a touch screen.

This application claims foreign priority to, and is based on, Korean Patent Application No. 2002-72694, the contents of which is incorporated herein by reference.

2. Description of the Related Art

FIG. 1 is a diagram of the structure of a related art apparatus for preventing noise in a touch screen, including a touch screen panel 11, a touch screen control unit 12, a central control unit 13, a liquid crystal display (LCD) control unit 14, and an LCD panel 15.

The touch screen panel 11 is an input device. The touch screen control unit 12 reads x and y coordinates of the touch screen. The central control unit 13 controls the entire related art system. The LCD control unit 14 controls the LCD panel. The LCD panel 15 is a video output device. In general, the touch screen control unit 12 and the LCD control unit 14 are controlled separately by the central control unit 13, and in some systems a liquid crystal driving signal is used.

The touch screen control unit 12 converts analog-type x and y voltage values of the touch screen by an external input into digital values and sends the digital values to the system CPU. At this time, the x and y voltage values are analog values that are very sensitive to external noise. The biggest influence on the analog values is signals generated by a most closely located LCD.

However, the related art has various problems and disadvantages. For example, but not by way of limitation, when a video is displayed in an LCD display panel, gates in the panel are turned on, a liquid crystal driving signal is output, and the LCD panel displays a video. At this time, a large voltage is provided momentarily, and glitch noise is generated.

Since the aforementioned glitch noise affects the touch screen panel voltage, an accurate voltage value cannot be obtained. To reduce glitch noise, the touch screen control unit 12 monitors the liquid crystal driving signal and operates the touch screen panel only when the liquid crystal driving signal does not operate. By doing so, the noise generated by the LCD is eliminated. However, as the LCD panel has evolved to a high resolution color LCD, the speed of the liquid crystal driving signal has increased greatly, and it has become impossible to monitor the liquid crystal driving signal and operate the touch screen with the related art high resolution color LCD.

As another method to prevent noise, the LCD panel itself is grounded so that excitation of LCD noise to the outside is prevented. However, this method cannot prevent noise completely because of different noise characteristics and operation voltages.

In addition, since the above related art methods need addition of a noise elimination circuit to the LCD panel itself or mechanical shielding, substantial cost accrues. Further, due to irregular results, a huge amount of development time is required.

SUMMARY OF THE INVENTION

To solve the above problems, it is an objective of the present invention to provide an apparatus and method for generating a noise-preventing clock, and more particularly, to provide an apparatus and method for generating a video clock to prevent noise in a touch screen. It is another objective of the present invention to provide an apparatus and method for preventing noise in a touch screen using a touch screen noise-preventing clock.

According to an aspect of the present invention, there is provided a noise-preventing apparatus comprising an analog-to-digital converting unit which receives analog source data, converts the received analog source data into digital source data, and sends the converted data; an input detection signal generation unit which generates an input detection signal containing information on a period from when the analog-to-digital converting unit receives analog source data to the time when the analog-to-digital converting unit finishes conversion of the analog source data into digital source data, and sends the signal; and a noise-preventing clock generation unit which receives the input detection signal sent by the input detection signal generation unit, generates a predetermined clock, and by referring to the information on the period contained in the received input detection signal, during the period from when analog source data is received to the time when conversion of the analog source data to digital source data is finished, disabling the generated clock and sending the clock, and during the remaining period, releasing the disabling and sending the clock.

According to another aspect of the present invention, there is provided a touch screen noise-preventing video clock generation apparatus comprising an analog-to-digital converting unit which receives analog coordinate data, converts the received analog coordinate data into digital coordinate data, and sends the converted data; an input detection signal generation unit which generates an input detection signal which is in a "high" logic level during a period from when the analog-to-digital converting unit receives analog coordinate data to the time when the analog-to-digital converting unit finishes conversion of the analog coordinate data into digital coordinate data and is in a "low" logic level during the remaining period, and sends the signal; and a noise-preventing video clock generation unit which receives the input detection signal sent by the input detection signal generation unit, generates a video pixel clock commanding to display video pixels in each predetermined cycle, generates a video line clock commanding to display a video line in each cycle that is a multiple of the predetermined cycle, using the generated video pixel clock, and during a period from when the received input detection signal and the generated video line clock are both in a "high" logic level to the time when the received input detection is transited to a "low" logic level, holds the state of the generated video pixel clock in a "low" logic level and sends the video line clock that is held in a "high" logic level as a result of holding the video pixel clock in a "low" logic level, and during the remaining period releases the holding and sends the video line clock.

According to another aspect of the present invention, there is provided a touch screen noise-preventing apparatus comprising a touch screen input unit which if a touch input to a predetermined location of a touch screen panel is received, generates analog coordinate data and sends the data; a touch screen input control unit which receives the analog coordinate data sent by the touch screen input unit, converts the received analog coordinate data into digital coordinate data and sends the converted data, and generates and sends an input detection signal which is in a "high" logic level during a period from when analog coordinate data is received to the time when conversion of the analog coordinate data to digital coordinate data is finished and is in a "low" logic level during the remaining period; a noise-preventing video clock generation unit which receives the input detection signal sent by the touch screen input control unit, generates a video pixel clock commanding to display video pixels in each predetermined cycle, generates a video line clock commanding to display a video line in each cycle that is a multiple of the predetermined cycle, by using the generated video pixel clock, and during a period from when the received input detection signal and the generated video line clock are both in a "high" logic level to the time when the received input detection is transited to a "low" logic level, holds the state of the generated video pixel clock in a "low" logic level and sends the video line clock that is held in a "high" logic level as a result of holding the video pixel clock in a "low" logic level, and during the remaining period, releases the holding and sends the video line clock; a central control unit which receives digital coordinate data sent by the touch screen input control unit, generates video data corresponding to the received digital coordinate data, and sends the video data; a video output control unit which receives and stores the video data sent by the central control unit, receives the video line clock and video pixel clock from the noise-preventing video clock generation unit, sends predetermined pixel data among stored video data in each cycle of the received pixel clock, and sends the received video line clock and video pixel clock; and a video output unit which receives the pixel data, video pixel clock, and video line clock sent by the video output control unit, inputs the received pixel data to a predetermined video display panel in each cycle of the received video pixel clock, and inputs a predetermined driving voltage to the video display panel in each cycle of the received video line clock so that a video is output.

According to another aspect of the present invention, there is provided a noise-preventing clock generation method comprising (a) receiving analog source data, converting the received analog source data into digital source data, and sending the digital source data; (b) generating an input detection signal containing information on the period from when analog source data is received to the time when conversion of the analog source data to digital source data is finished and sending the signal; and (c) receiving the sent input detection signal, generating a predetermined clock, and by referring to the information contained in the received input detection signal, during the period from when analog source data is received to the time when conversion of the analog source data to digital source data is finished, disabling the he generated clock and sending the clock, and during the remaining period, releasing the disabling and sending the clock.

According to another aspect of the present invention, there is provided a touch screen noise-preventing video clock generation method comprising (a) receiving analog coordinate data from a touch screen panel, converting the received analog coordinate data into digital coordinate data, and sending the digital coordinate data; (b) generating an input detection signal which is in a "high" logic level during a period from when analog coordinate data is received to the time when conversion of the analog coordinate data to digital coordinate data is finished and is in a "low" logic level during the remaining period, and sending the input detection signal; and (c) receiving the sent input detection signal, generating a video pixel clock commanding to display video pixels in each predetermined cycle, generating a video line clock commanding to display a video line in each cycle that is a multiple of the predetermined cycle by using the generated video pixel clock, and during a period from when the received input detection signal and the generated video line clock are both in a "high" logic level to the time when the received input detection is transited to a "low" logic level, holding the state of the generated video pixel clock in a "low" logic level and sending the video line clock that is held in a "high" logic level as a result of holding the video pixel clock in a "low" logic level, and during the remaining period, releasing the holding and sending the video line clock.

According to another aspect of the present invention, there is provided a touch screen noise-preventing method comprising (a) If a touch input is received in a predetermined location of a touch screen panel, generating analog coordinate data indicating the coordinates of the location and sending the data; (b) receiving the sent analog coordinate data, converting the received analog coordinate data into digital coordinate data, sending the converted data, generating an input detection signal which is in a "high" logic level during a period from when analog coordinate data is received to the time when conversion of the analog coordinate data to digital coordinate data is finished and is in a "low" logic level during the remaining period, and sending the input detection signal; (c) receiving the sent input detection signal, generating a video pixel clock commanding to display video pixels in each predetermined cycle, generating a video line clock commanding to display a video line in each cycle that is a multiple of the predetermined cycle, by using the generated video pixel clock, and during a period from when the received input detection signal and the generated video line clock are both in a "high" logic level to the time when the received input detection is transited to a "low" logic level, holding the state of the generated video pixel clock in a "low" logic level and sending the video line clock that is held in a "high" logic level as a result of holding the video pixel clock in a "low" logic level, and during the remaining period, releasing the holding and sending the video line clock; (d) receiving the sent digital coordinate data, generating video data corresponding to the received digital coordinate data, and sending the video data; (e) receiving and storing the sent video data, receiving the sent video line clock and video pixel clock, sending predetermined pixel data among the stored video data in each cycle of the received video pixel, and sending the received video line clock and video pixel clock; and (f) receiving the sent pixel data, video pixel clock, and video line clock, inputting the received pixel data to a predetermined video display panel in each cycle of the received video pixel clock, and inputting a predetermined driving voltage to the video display panel in each cycle of the received video line clock so that a video is output.

BRIEF DESCRIPTION OF THE DRAWINGS

The above objects and advantages of the present invention will become more apparent by describing in detail preferred embodiments thereof with reference to the attached drawings in which:

FIG. 7 shows waveform diagrams comparing a waveform when a non-limiting, exemplary embodiment of the present invention was applied and a waveform when the present invention was not applied.

DESCRIPTION OF THE PREFERRED EMBODIMENTS

Figure 1:
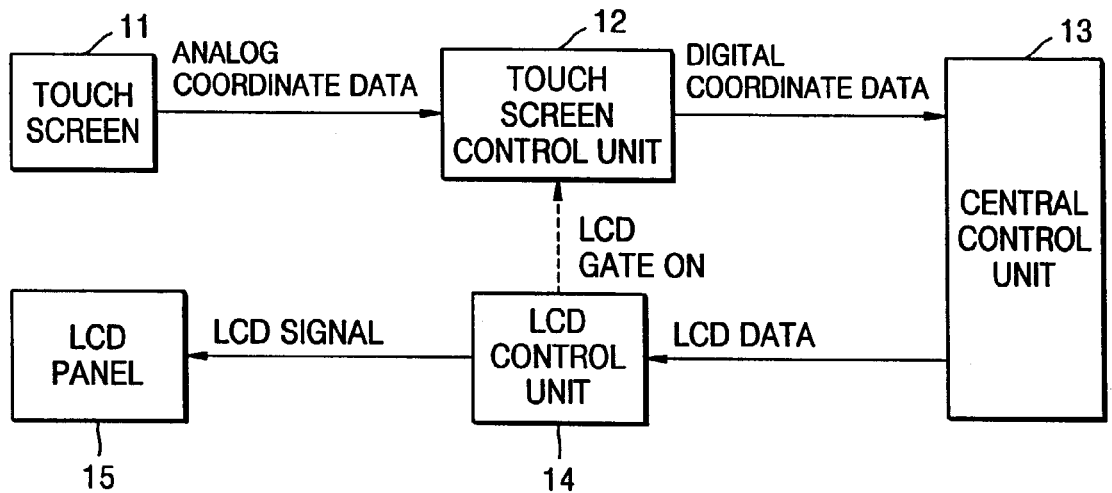
FIG. 1 is a diagram of the structure of a related art apparatus for preventing noise in a touch screen.
Figure 2:
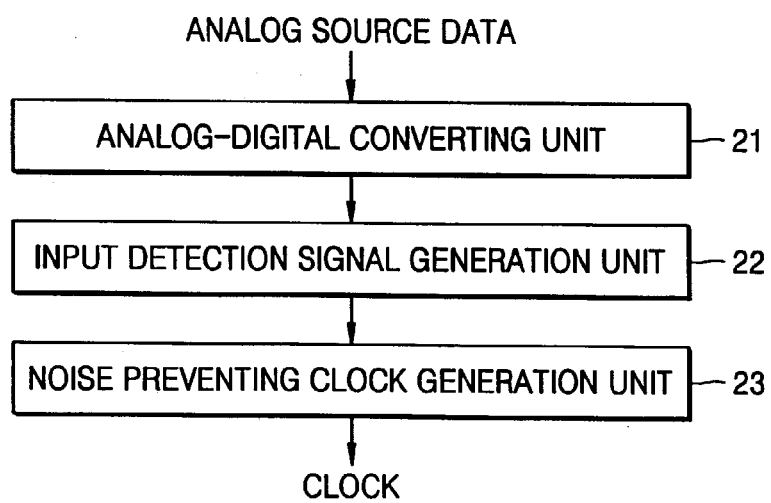
FIG. 2 is a diagram of the structure of a noise-preventing clock generation apparatus according to a non-limiting, exemplary embodiment of the present invention.

Referring to FIG. 2, a noise-preventing clock generation apparatus according to a non-limiting, exemplary embodiment of the present invention includes an analog-to-digital converting unit 21, an input detection signal generation unit 22, and a noise-preventing clock generation unit 23.

The analog-to-digital converting unit 21 receives analog source data, converts the received analog source data into digital source data, and sends the converted data. The digital source data is obtained by sampling predetermined digital data corresponding to the analog source data. Analog-type data becomes a continuous value, such as a voltage value, a current value, a coordinate value, or a temperature value. To convert analog-type data into digital-type data, sampling is needed to extract continuously, in each predetermined cycle, sample digital data corresponding to any of the continuous values while the value continues. Analog-type data is distributed in the form of continuous values and therefore is weak to external noise. However, digital-type data is expressed by binary numbers 0 and 1 and is strong to external noise. Accordingly, a module for converting analog-type data into digital-type data (usually referred to as an AD converter) is used in a variety of apparatuses.

The input detection signal generation unit 22 generates an input detection signal containing information on a period from the time when the analog-to-digital converting unit 21 receives analog source data to the time when the analog-to-digital converting unit 21 finishes conversion of the analog source data into digital source data, and sends the signal. If noise comes from the outside and affects analog source data while the analog source data is converted into digital source data, changed analog source data is converted into digital source data. In this case, the value changed by noise is digitized instead of the original value, such that the purpose of analog-to-digital conversion cannot be accomplished.

Accordingly, when analog data is converted to digital data, an input detection signal containing information on a period when noise can intrude (i.e., a period from the time when analog source data is received to the time when conversion of the analog source data to digital source data is finished) is generated and sent. The time when conversion of the analog source data to digital source data is finished is the time when sampling of the digital data is completed.

The noise-preventing clock generation unit 23 receives the input detection signal sent by the input detection signal generation unit 22, generates a predetermined clock signal. During the period contained in the received input detection signal (i.e., the period from when analog source data is received to when conversion of the analog source data to digital source data is finished), the noise-preventing clock generation unit 22 disables the generated clock signal. During the remaining period, the noise-preventing clock generation unit 23 releases the disabling and sends the clock signal. The clock signal is a pulse having a predetermined cycle, and synchronizes the operation of each device operating in a system and adjusts the operating time.

Accordingly, the clock signal should be provided for all operations, including (but not limited to) input, output, and computation operations. The noise-preventing clock generation unit 23 disables and sends the clock signal when noise can intrude (i.e., the period from when analog source data is received to when conversion of the analog source data to digital source data is finished) and releases the disabling and sends the clock signal during the remaining period. By doing so, the clock signal that can prevent intrusion of noise is generated.

Figure 3:
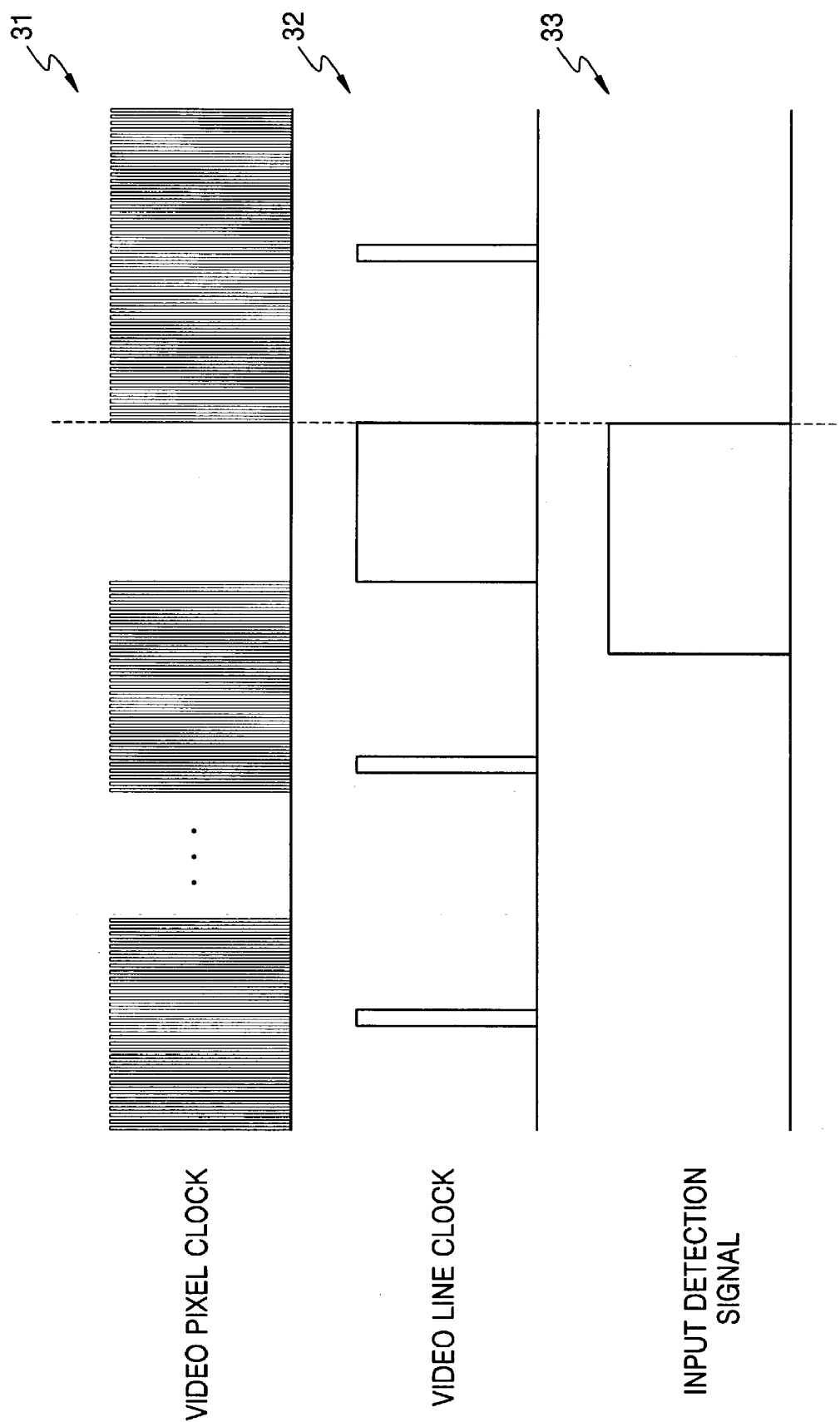
FIG. 3 shows waveform diagrams of signals used in a touch screen noise-preventing video signal generation apparatus according to a non-limiting, exemplary embodiment of the present invention.

FIG. 3 shows waveform diagrams of signals used in a touch screen noise-preventing video signal generation apparatus according to a non-limiting, exemplary embodiment of the present invention.

Like the noise-preventing clock generation apparatus of FIG. 2, the touch screen noise-preventing video clock generation apparatus according to the present invention, to which the noise-preventing clock generation apparatus is applied, comprises an analog-to-digital converting unit, an input detection signal generation unit, and a noise-preventing video clock generation unit. All signals for video output are synchronized to a video pixel clock signal. If the video pixel clock signal is disabled, the video output stops. During normal operation, the video pixel clock signal is activated such that the video output is normally displayed. However, when an input to the touch screen is detected, the clock is disabled until the system finishes sampling analog coordinate data, thus removing noise and delaying video output for a short while. If the video clock is disabled for a long time, the video output is delayed such that a normal image cannot be output. However, if the video display is delayed only for the sampling time, human eyes cannot perceive the delay.

The analog digital converting unit receives analog coordinate data from the touch screen panel, converts the received analog coordinate data into digital coordinate data and sends the converted data. Here, the digital coordinate data is obtained by sampling predetermined digital data corresponding to the analog coordinate data. If a user touches the touch screen using a finger or a pen, a voltage (usually between 0V and 3.3V, but not limited thereto) is output from the touch screen panel. This voltage value is the coordinate value of the location touched by the user. Since this coordinate value is analog-type data, the analog-to-digital converting unit converts this into digital-type data and sends the data.

The input detection signal generation unit generates an input detection signal in a "high" logic level during a period from when the analog-to-digital converting unit receives analog coordinate data to when the analog-to-digital converting unit finishes conversion of the analog coordinate data into digital coordinate data and is in a "low" logic level during the remaining period, and sends the signal. Conversion of the analog source data to digital source data is finished when sampling of predetermined digital data corresponding to the analog coordinate data is completed.

As described above, the input detection signal should contain information on the period when noise can intrude (i.e., information on the period from the time when analog source data is received to the time when conversion of the analog source data to digital source data is finished). Accordingly, in the present invention a waveform in a "high" logic level during the period from when analog source data is received to when conversion of the analog source data to digital source data is finished, and in a "low" logic level during the remaining period, is implemented. As a result, the interval in a "high" logic level can indicate the period from when analog source data is received to when conversion of the analog source data to digital source data is finished (reference character 33 of FIG. 3).

The noise-preventing video clock generation unit receives the input detection signal sent by the input detection signal generation unit, generates a video pixel clock signal commanding display of video pixels in each predetermined cycle and a video line clock signal commanding display of a video line signal in each cycle that is a multiple of the predetermined cycle, using the generated video pixel clock signal. During a period from when the received input detection signal and the generated video line clock are in a "high" logic level to when the received input detection is transited to a "low" logic level, the noise-preventing video clock generation unit holds the state of the generated video pixel clock signal in a "low" logic level and sends the video line clock signal that is held in a "high" logic level as a result of holding the video pixel clock signal in a "low" logic level. During the remaining period, the noise-preventing video clock generation unit releases the holding and sends the video line clock signal.

In each cycle of the video pixel clock it is determined whether to turn on or off a pixel. Generally, a video signal is expressed by a red green blue (RGB) method expressing a color by mixing red, green, and blue the three primary colors of light. The RGB method uses an addition method to make a desired color by mixing the ratio of red, green, and blue. That is, each pixel of a video signal shows red, green, or blue, and by digital video data formed by binary numbers 0 and 1, it is determined whether to turn on or off each pixel (0 indicates off and 1 indicates on).

The video line clock signal generated by multiplication of the frequency of the video pixel clock signal has a cycle several hundred times as long as the cycle of the video pixel clock signal. That is, a period when turning on or off hundreds of pixels in one line in a video is determined is one cycle of the video line clock signal, and in each video line clock signal a line in which whether to turn on or off pixels is determined is displayed. The time when the received input detection signal is in a "high" logic level indicates when the analog source data is received and when the video pixel clock signal is disabled to cut off noise.

However, noise occurs when a voltage with a high peak is provided. That is, noise occurs only the sharp peak part of the video line clock signal 32. In order to reduce the period when the video pixel clock signal is disabled, the video pixel clock signal 31 is disabled from the time when the input detection signal 33 is in a "high" logic level and the video line clock signal is in a "high" logic level (33). Then, when the input detection signal 33 is transited to a "low" logic level the disabling of the video pixel clock signal 31 is released. In the present invention, by holding the state of the video pixel clock signal in a "low" logic level, the video pixel clock signal is disabled.

As described above, since the video line clock signal is obtained by multiplication of the video pixel clock signal, if the state of the video pixel clock signal is held in one level, the video line clock signal is also held in one level. Since the state of the video pixel clock signal is held when the video line clock signal is in a "high" logic level, the state of the video line clock signal is held in a "high" logic level. The video pixel clock signal is released when the input detection signal 33 is transited to a "low" logic level, and the video line clock signal 32 is also released.

If sampling is continuously performed, the video pixel clock signal is in a continuous disabled state such that there may be a failure in video display. However, in actual operations, sampling speed is not so fast, and sampling is performed at a cycle of maximum 150~300 times per second. Also, since the sampling time is less than 100 μsec, it has little influence on video output. Further, to prevent the sharp peak part of the video line clock signal, sampling is delayed for a predetermined time. That is, when the input detection signal is in a "high" logic level and the video line clock signal is in a "high" logic level, the analog-to-digital converting unit begins conversion into digital coordinate data. Though video output is delayed, there is no failure in the video output.

Figure 4:
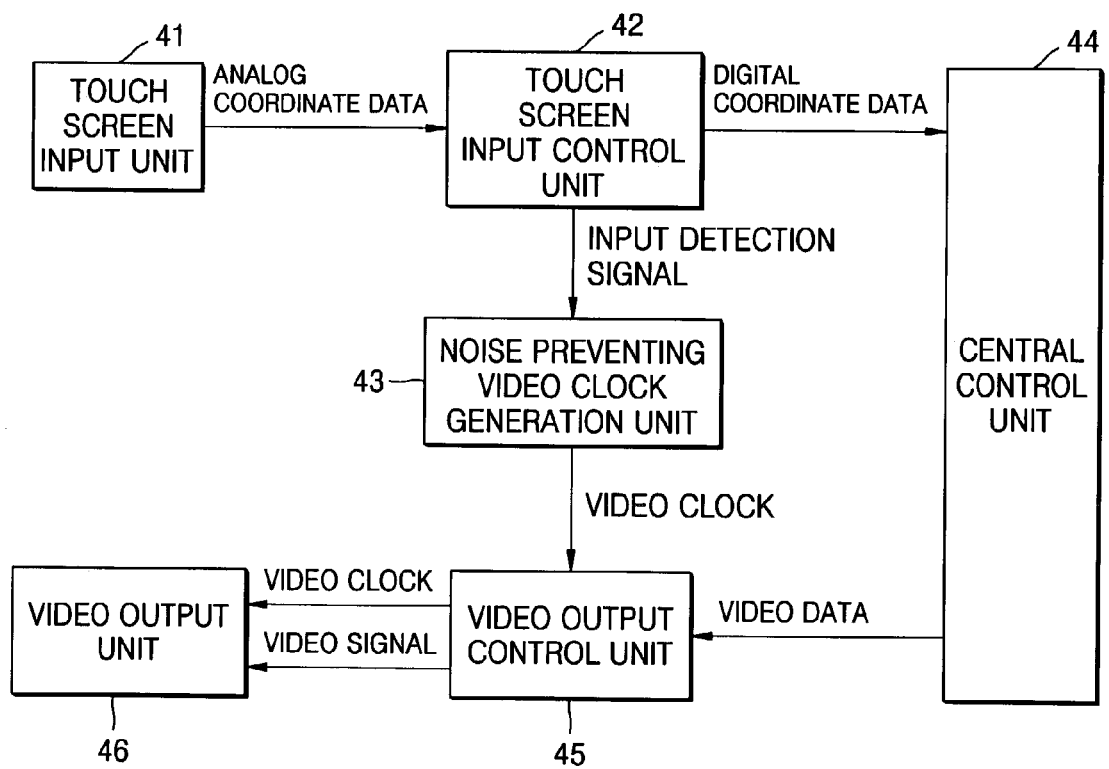
FIG. 4 is a diagram of the structure of a touch screen noise-preventing apparatus according to a non-limiting, exemplary embodiment of the present invention.

FIG. 4 is a diagram of the structure of a touch screen noise-preventing apparatus according to an exemplary, non-limiting embodiment of the present invention. The touch screen noise-preventing apparatus comprises a touch screen input unit 41, a touch screen input control unit 42, a noise-preventing video clock generation unit 43, a central control unit 44, a video output control unit 45, and a video output unit 46. The touch screen input unit 41 generates analog coordinate data indicating the coordinates of the location and sends the data when a touch input is received in a predetermined location of the touch screen panel.

The touch screen input control unit 42 receives the analog coordinate data sent by the touch screen input unit 41, converts the received analog coordinate data into digital coordinate data and sends the converted data. The touch screen input control unit 42 generates and sends an input detection signal in a "high" logic level during a period from when analog coordinate data is received to when conversion of the analog coordinate data to digital coordinate data is finished, and is in a "low" logic level during the remaining period.

The digital coordinate data is obtained by sampling predetermined digital data corresponding to the analog coordinate data. The time when the analog coordinate data is converted into digital coordinate data is the time when sampling the predetermined digital data corresponding to the analog coordinate data is finished. As described above, the touch screen input control unit 42 begins conversion into the digital coordinate data from the time when the received input detection signal is in a "high" logic level and the generated video line clock signal is in a "high" logic level.

The noise-preventing video clock generation unit 43 receives the input detection signal sent by the touch screen input control unit 42, generates a video pixel clock signal commanding to display video pixels in each predetermined cycle, and generates a video line clock signal commanding to display a video line in each cycle that is a multiple of the predetermined cycle, using the generated video pixel clock signal. During a period from when the received input detection signal and the generated video line clock signal are both in a "high" logic level to when the received input detection is transited to a "low" logic level, the noise-preventing video clock signal generation unit 43 holds the state of the generated video pixel clock signal in a "low" logic level and sends the video line clock signal that is held in a "high" logic level as a result of holding the video pixel clock signal in a "low" logic level. During the remaining period, the noise-preventing video clock signal generation unit 43 releases the holding of the video pixel clock signal and sends the video line clock signal.

The central control unit 44 receives digital coordinate data sent by the touch screen input control unit 42, generates video data corresponding to the received digital coordinate data, and sends the video data. The central control unit 44 performs the operation indicated by the coordinates of the location touched by the user (for example, but not by way of limitation, reproduce, copy, delete, reduce, magnify, etc.) and generates video data as the result of the operation, and sends the generated video data.

The video output control unit 45 receives and stores the video data sent by the central control unit 44, receives the video line clock signal and video pixel clock signal from the noise-preventing video clock signal generation unit 43, sends predetermined pixel data among stored video data in each cycle of the received pixel clock signal, and sends the received video line clock signal and video pixel clock signal. The video output control unit 45 stores the video data sent by the central control unit 44 in a frame buffer. This stored video data is sent as a video signal with clock signals to the video output unit 46 to output a video. Here, a video signal is video data sequentially output after being synchronized by the video pixel clock signal. The video output control unit 45 converts the video data in a form that can be processed by the video output unit 46. That is, in each cycle of the video pixel clock signal, predetermined pixel data among the stored video data is sent. Also, a variety of signals needed to operate the video output unit 46 are sent.

The video output unit 46 receives the pixel data, video pixel clock signal, and video line clock signal sent by the video output control unit 45, inputs the received pixel data to a predetermined video display panel in each cycle of the received video pixel clock signal, and inputs a predetermined driving voltage to the video display panel in each cycle of the received video line clock signal such that a video is output.

If the video display panel is a thin film transistor (TFT) LCD, the video pixel clock signal is a pulse providing a cycle for switching the TFT. In that case, the video output control unit 45 converts video data to a format that can be processed by the TFT and sends a variety of timing signals needed in the TFT. The video pixel clock signal provides an actual liquid crystal driving voltage to the liquid crystal using the video data, and the video line clock signal is used to output a signal turning on the TFT of a pixel so that data voltage can be provided to each pixel. Also, the video output unit 46 inputs the received pixel data in each cycle of the received video pixel clock signal, to the source terminal of the TFT of a liquid crystal device of the TFT LCD panel (the device on which the pixel data is to be displayed), and inputs a predetermined driving voltage in each cycle of the received video line clock signal to the gate terminal of the TFT such that a video is output.

Figure 5:
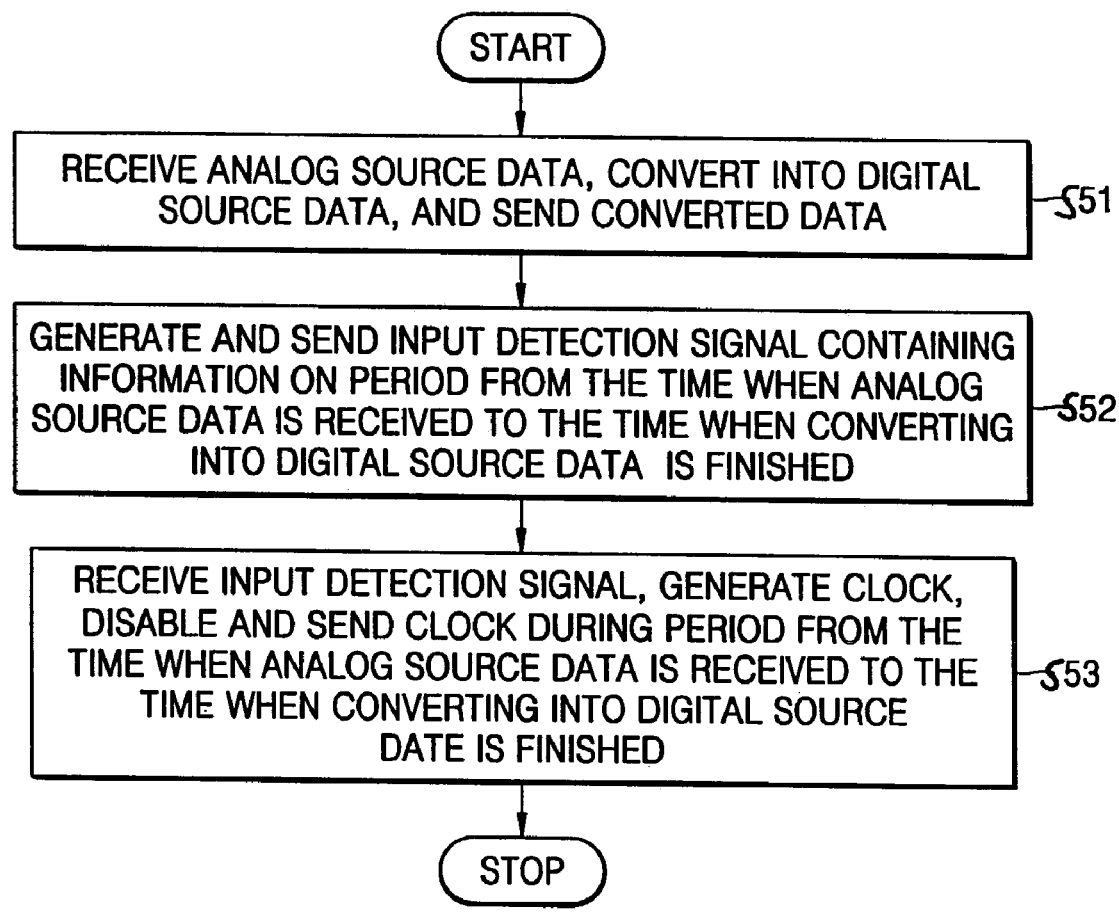
FIG. 5 is a flowchart showing a noise-preventing clock generation method according to a non-limiting, exemplary embodiment of the present invention.

FIG. 5 is a flowchart showing a noise-preventing clock generation method according to the present invention. Analog source data is received, converted into digital source data, and the converted data is sent in step S51. The digital source data is obtained by sampling predetermined digital data corresponding to the analog source data.

Then, in step S52, an input detection signal containing information on the period from when analog source data is received to when conversion of the analog source data to digital source data is finished is generated and sent. Sampling the digital data is completed when converting the analog source data into the digital source data is finished.

In step S53, the sent input detection signal is received and a predetermined clock signal is generated. Referring to the information contained in the received input detection signal, during the period from when analog source data is received to when conversion of the analog source data to digital source data is finished, the generated clock signal is disabled and sent, and during the remaining period the disabling is released and the clock signal is sent.

A touch screen noise-preventing video clock generation method according to the present invention to which the noise-preventing clock generation method is applied to a touch screen panel has the following steps. Analog coordinate data is received from a touch screen panel, converted into digital coordinate data, and sent. To prevent the sharp peak part of a video line clock signal, conversion into digital coordinate data begins when the received input detection is in a "high" logic level and the generated video line clock signal is in a "high" logic level. The digital coordinate data is obtained by sampling predetermined digital data corresponding to the analog coordinate data.

Then, an input detection signal, which is in a "high" logic level during a period from when analog coordinate data is received to when conversion of the analog coordinate data to digital coordinate data is finished and is in a "low" logic level during the remaining period, is generated and sent. The time when the analog coordinate data is converted into digital coordinate data is when sampling predetermined digital data corresponding to the analog coordinate data is finished.

Then, the sent input detection signal is received, a video pixel clock signal commanding to display video pixels in each predetermined cycle is generated and a video line clock signal commanding to display a video line in each cycle that is a multiple of the predetermined cycle, is generated using the generated video pixel clock signal. During a period from when the received input detection signal and the generated video line clock signal are in a "high" logic level to when the received input detection is transited to a "low" logic level, the state of the generated video pixel clock signal is held in a "low" logic level and the video line clock signal that is held in a "high" logic level as a result of holding the video pixel clock signal in a "low" logic level is sent. During the remaining period, the holding is released and the video line clock signal is sent.

Figure 6:
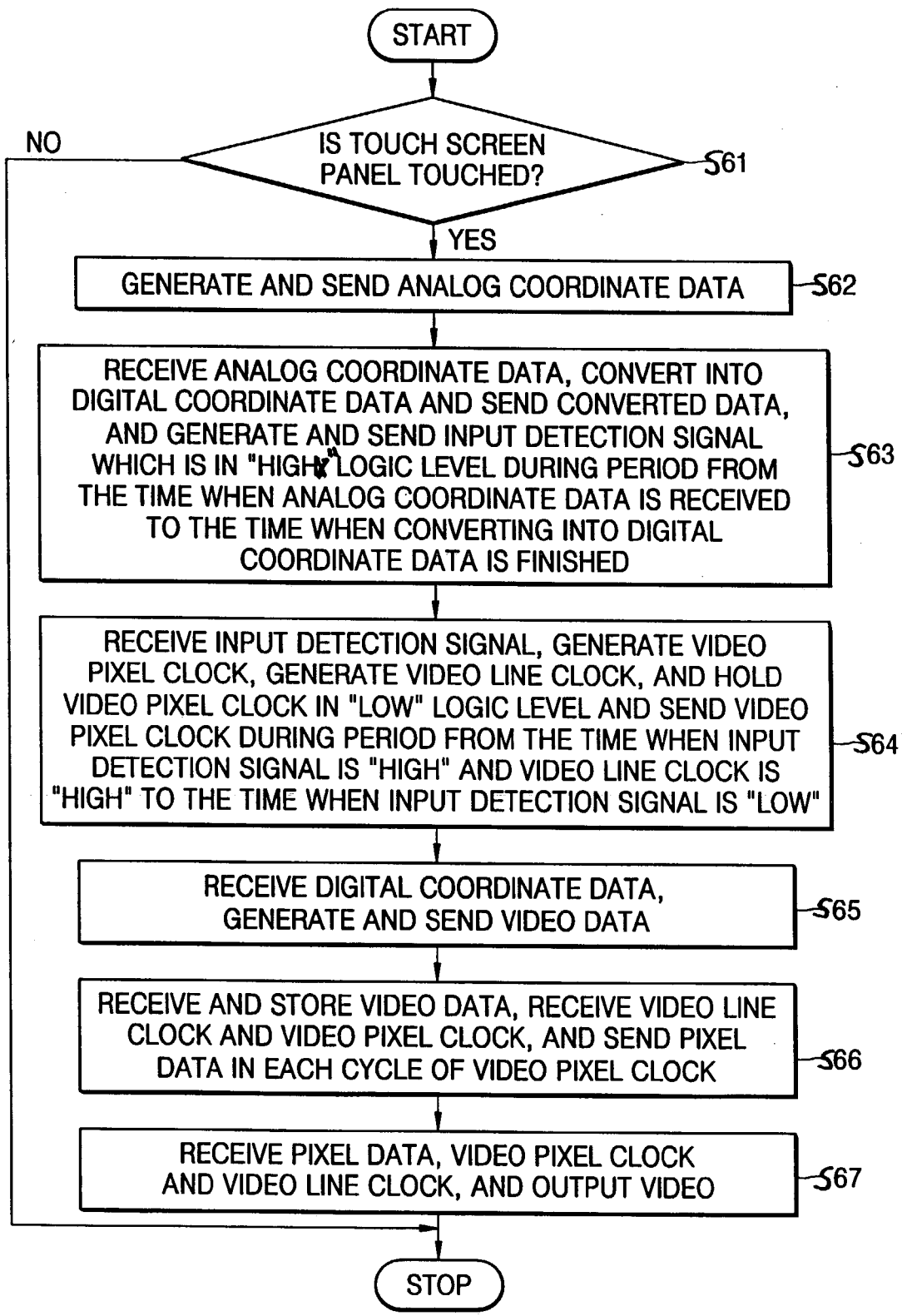
FIG. 6 is a flowchart showing a touch screen noise-preventing method according to a non-limiting, exemplary embodiment of the present invention.

FIG. 6 is a flowchart showing a touch screen noise-preventing method according to an exemplary, non-limiting embodiment of the present invention. If a touch input is received in a predetermined location of the touch screen panel in step S61, analog coordinate data indicating the coordinates of the location is generated and sent in step S62. Then, in step S63 the sent analog coordinate data is received, the received analog coordinate data is converted into digital coordinate data and the converted data is sent. An input detection signal, which is in a "high" logic level during a period from when analog coordinate data is received to when conversion of the analog coordinate data to digital coordinate data is finished and is in a "low" logic level during the remaining period, is generated and sent in step S63. The digital coordinate data is obtained by sampling predetermined digital data corresponding to the analog coordinate data, and the time when the analog coordinate data is converted into digital coordinate data is when sampling predetermined digital data corresponding to the analog coordinate data is finished.

To prevent the sharp peak part of a video line clock signal, converting into digital coordinate data begins when the received input detection is in a "high" logic level and the generated video line clock signal is in a "high" logic level. Then, the sent input detection signal is received, a video pixel clock signal commanding to display video pixels in each predetermined cycle is generated, and a video line clock signal commanding to display a video line in each cycle that is a multiple of the predetermined cycle, is generated using the generated video pixel clock signal.

At step S64, during a period from when the received input detection signal and the generated video line clock signal are both in a "high" logic level to when the received input detection is transited to a "low" logic level, the state of the generated video pixel clock signal is held in a "low" logic level and the video line clock signal held in a "high" logic level as a result of holding the video pixel clock signal in a "low" logic level is sent. During the remaining period, the holding is released and the, video line clock signal is sent. Then, in step S65 the sent digital coordinate data is received and video data corresponding to the received digital coordinate data is generated and sent. Then, the sent video data is received and stored, and the sent video line clock signal and video pixel clock signal are received.

In each cycle of the received video pixel, predetermined pixel data among the stored video data is sent, and the received video line clock signal and video pixel clock signal are sent in step S66. Then, in step S67 the sent pixel data, video pixel clock signal, and video line clock signal are received, and in each cycle of the received video pixel clock signal, the received pixel data is input to a predetermined video display panel. Further, in each cycle of the received video line clock signal, a predetermined driving voltage is input to the video display panel so that a video is output.

If the video display panel is a TFT LCD, the video pixel clock signal is a pulse providing a cycle for switching the TFT. In each cycle of the received video pixel clock signal, the received pixel data is input to the source terminal of the TFT of a liquid crystal device of the TFT LCD panel, the device on which the pixel data is to be displayed. In each cycle of the received video line clock signal a predetermined driving voltage is input to the gate terminal of the TFT such that a video is output.

FIG. 7 shows waveform diagrams comparing a waveform when an exemplary, non-limiting embodiment of the present invention was applied and a waveform when the present invention was not applied. The waveform diagrams show waveforms of voltage values output from a touch screen panel in a system having a TFT LCD on which the touch screen panel is mounted. Generally, being synchronized to the video line clock, a voltage of about 10V is provided to the gate terminal of the TFT of each pixel of a TFT LCD panel. At this time, by a relatively small voltage difference due to a sudden voltage change, noise is generated in the touch screen panel that is determining coordinate values of a touched location. The waveform 71 when the present invention was not applied shows a plurality of mixed noise components. In contrast, the waveform 72 when the present invention was applied shows that the noise is eliminated.

The present invention may be embodied in a code, which can be read by a computer, on a computer readable recording medium. The computer readable recording medium includes recording apparatuses on which computer readable data are stored. The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). However, the present invention is not limited thereto.

The present invention has various advantages. For example (but not by way of limitation), according to the present invention, a clock signal for preventing noise can be generated by using a predetermined number of gates such that noise can be perfectly prevented in advance and the cost can be reduced.

Also, since the present invention can be applied to a touch screen apparatus having any kind of LCD, including the TFT LCD, and to CRTs, the present invention may have extensive application in the future in designing LCD panel control units and touch screen panel control units.

Optimum embodiments have been explained above and are shown. However, the present invention is not limited to the preferred embodiment described above, and it is apparent that variations and modifications by those skilled in the art can be effected within the spirit and scope of the present invention defined in the appended claims. Therefore, the scope of the present invention is not determined by the above description but by the accompanying claims.

What is claimed is:

1. A noise-preventing apparatus comprising:
   an analog-to-digital converting unit that converts received analog source data into digital source data, and outputs the converted data;
   an input detection signal generation unit which generates an input detection signal containing information on a period from when the analog-to-digital converting unit receives analog source data to when the analog-to-digital converting unit finishes conversion of the received analog source data into digital source data, and transmits the input detection signal; and
   a noise-preventing clock generation unit which receives the transmitted input detection signal, generates a predetermined clock signal, and based on information on the period included in the received input detection signal, disables the generated clock signal during the period from when analog source data is received to when conversion of the analog source data to digital source data is finished, and releases the disabling and sends the clock signal during a remaining period.

2. The apparatus of claim 1, wherein the digital source data is obtained by sampling predetermined digital data corresponding to the analog source data.

3. The apparatus of claim 2, wherein conversion of the analog source data to digital source data is finished when the sampling is completed.

4. A touch screen noise-preventing video clock generation apparatus comprising:
   an analog-to-digital converting unit which converts received analog coordinate data into digital coordinate data, and outputs the converted data;
   an input detection signal generation unit which generates an input detection signal at a "high" logic level during a period from when the analog-to-digital converting unit receives analog coordinate data to when the analog-to-digital converting unit finishes conversion of the received analog coordinate data into digital coordinate data and is at a "low" logic level during a remaining period, and outputs the signal; and
   a noise-preventing video clock generation unit which receives the input detection signal, generates a video pixel clock signal commanding display of video pixels in each predetermined cycle, generates a video line clock signal commanding display of a video line in each cycle that is a multiple of the predetermined cycle, using the generated video pixel clock signal, and during a period from when the received input detection signal and the generated video line clock signal are in a "high" logic level to when the received input detection is transited to a "low" logic level, holds the state of the generated video pixel clock signal in a "low" logic level and sends the video line clock signal that is held in a "high" logic level as a result of holding the video pixel clock signal in a "low" logic level, and during the remaining period releases the holding and sends the video line clock signal.

5. The apparatus of claim 4, wherein the digital coordinate data is obtained by sampling predetermined digital data corresponding to the analog coordinate data.

6. The apparatus of claim 5, wherein conversion of the analog coordinate data to digital coordinate data is finished when the sampling is completed.

7. The apparatus of claim 6, wherein the analog-to-digital converting unit begins conversion into digital coordinate data when the received input detection signal is in a "high" logic level and the generated video line clock signal is in a "high" logic level.

8. A touch screen noise-preventing apparatus comprising:
a touch screen input unit that generates and transmits analog coordinate data when an input to a predetermined location of a touch screen panel is received;
a touch screen input control unit which receives the analog coordinate data transmitted from the touch screen input unit, converts the received analog coordinate data into digital coordinate data and outputs the converted data, and generates and transmits an input detection signal in a "high" logic level during a period from when analog coordinate data is received to when conversion of the analog coordinate data to digital coordinate data is finished, and is in a "low" logic level during a remaining period;
a noise-preventing video clock generation unit which receives the transmitted input detection signal, generates a video pixel clock signal commanding display of video pixels in a predetermined cycle, generates a video line clock signal commanding display of a video line in each cycle that is a multiple of the predetermined cycle, by using the generated video pixel clock signal, and during a period from when the received input detection signal and the generated video line clock signal are in a "high" logic level to when the received input detection is transited to a "low" logic level, holds a state of the generated video pixel clock signal in a "low" logic level and sends the video line clock signal held in a "high" logic level as a result of holding the video pixel clock signal in a "low" logic level, and during a remaining period, releases the holding and sends the video line clock signal;
a central control unit which generates video data corresponding to the digital coordinate data received from the touch screen input control unit, and outputs the video data;
a video output control unit which receives and stores the video data output from the central control unit, receives the video line clock signal and video pixel clock signal from the noise-preventing video clock generation unit, sends predetermined pixel data among stored video data in each cycle of the received pixel clock signal, and sends the received video line clock signal and video pixel clock signal; and
a video output unit which receives the pixel data, video pixel clock signal, and video line clock signal sent by the video output control unit, inputs the received pixel data to a predetermined video display panel in each cycle of the received video pixel clock signal, and inputs a predetermined driving voltage to the video display panel in each cycle of the received video line clock signal so that a video is output.

9. The apparatus of claim 8, wherein the digital coordinate data is obtained by sampling predetermined digital data corresponding to the analog coordinate data.

10. The apparatus of claim 9, wherein the analog coordinate data is converted into digital coordinate data when the sampling is finished.

11. The apparatus of claim 10, wherein the touch screen input control unit begins conversion into the digital coordinate data when the received input detection signal is in a "high" logic level and the generated video line clock signal is in a "high" logic level.

12. The apparatus of claim 8, wherein the video display panel is a thin film transistor (TFT) LCD panel.

13. The apparatus of claim 12, wherein the video pixel clock signal is a pulse that provides a cycle for switching a TFT of said TFT LCD panel.

14. The apparatus of claim 13, wherein the video output unit inputs the received pixel data in each cycle of the received video pixel clock signal cycle, to a source terminal of the TFT of a liquid crystal device of the TFT LCD panel on which the pixel data is to be displayed, and inputs a predetermined driving voltage in each cycle of the received video line clock signal to a gate terminal of the TFT.

15. A noise-preventing clock generation method comprising:
(a) converting received analog source data into digital source data, and outputting the converted, received digital source data;
(b) generating an input detection signal containing information on the period from when analog source data is received to when conversion of the analog source data to digital source data is finished, and sending the input detection signal; and
(c) receiving the sent input detection signal, generating a predetermined clock, and based on information contained in the received input detection signal, during the period from when analog source data is received to when conversion of the analog source data to digital source data is finished, disabling the generated predetermined clock signal, and during a remaining period, releasing the disabling and sending the predetermined clock signal.

16. The method of claim 15, wherein the digital source data is obtained by sampling predetermined digital data corresponding to the received analog source data.

17. The method of claim 16, wherein conversion of the analog source data to digital source data is finished when the sampling is completed.

18. A touch screen noise-preventing video clock generation method comprising:
(a) converting analog coordinate data received from a touch screen panel into digital coordinate data, and sending the converted, received digital coordinate data;
(b) generating and sending an input detection signal which is in a "high" logic level during a period from when analog coordinate data is received to when conversion of the analog coordinate data to digital coordinate data is finished and in a "low" logic level during a remaining period; and
(c) receiving the sent input detection signal, generating a video pixel clock signal commanding display of video pixels in each predetermined cycle and a video line clock signal commanding display of a video line in each cycle that is a multiple of the predetermined cycle by using the generated video pixel clock signal, and during a period from when the received input detection signal and the generated video line clock signal are in a "high" logic level to when the received input detection is transited to a "low" logic level, holding the state of the generated video pixel clock signal in a "low" logic level and sending the video line clock signal that is held in a "high" logic level as a result of holding the video pixel clock signal in a "low" logic level, and during a remaining period, releasing the holding and sending the video line clock signal.

19. The method of claim 18, wherein the digital coordinate data is obtained by sampling predetermined digital data corresponding to the received analog coordinate data.

20. The method of claim 19, wherein the analog coordinate data is converted into digital coordinate data when the sampling is finished.

21. The method of claim 20, wherein in step (a) the converting begins when the received input detection signal is in a "high" logic level and the generated video line clock signal is in a "high" logic level.

22. A touch screen noise-preventing method comprising:
(a) if a touch input is received on a touch screen panel, generating analog coordinate data indicating the coordinates of a location of said touch input and sending the data;
(b) receiving the sent analog coordinate data, converting the received analog coordinate data into digital coordinate data, outputting the converted data, generating and transmitting an input detection signal at a "high" logic level during a period from when analog coordinate data is received to when conversion of the analog coordinate data to digital coordinate data is finished and is in a "low" logic level during a remaining period;
(c) receiving the transmitted input detection signal, generating a video pixel clock signal commanding display of video pixels in each predetermined cycle and a video line clock signal commanding to display a video line in each cycle that is a multiple of the predetermined cycle, by using the generated video pixel clock signal, and during a period from when the received input detection signal and the generated video line clock signal are in a "high" logic level to when the received input detection is transited to a "low" logic level, holding a state of the generated video pixel clock signal in a "low" logic level and sending the video line clock signal that is held in a "high" logic level as a result of holding the video pixel clock signal in a "low" logic level, and during the remaining period, releasing the holding and sending the video line clock signal;
(d) receiving the sent digital coordinate data, generating video data corresponding to the received digital coordinate data, and sending the video data;
(e) receiving and storing the sent video data, receiving the sent video line clock signal and video pixel clock signal, sending predetermined pixel data among the stored video data in each cycle of the received video pixel, and sending the received video line clock signal and video pixel clock signal; and
(f) receiving the sent pixel data, video pixel clock signal, and video line clock signal, inputting the received pixel data to a predetermined video display panel in each cycle of the received video pixel clock signal, and inputting a predetermined driving voltage to the video display panel in each cycle of the received video line clock signal so that a video is output.

23. The method of claim 22, wherein the digital coordinate data is obtained by sampling predetermined digital data corresponding to the analog coordinate data.

24. The method of claim 23, wherein the analog coordinate data is converted into digital coordinate data when the sampling is finished.

25. The method of claim 24, wherein in step (b) converting into digital coordinate data begins when the received input detection signal is in a "high" logic level and the generated video line clock signal is in a "high" logic level.

26. The method of claim 22, wherein the video display panel is a thin film transistor (TFT) liquid crystal display (LCD) panel.

27. The method of claim 26, wherein the video pixel clock signal is a pulse that provides a cycle for switching a TFT of the TFT LCD panel.

28. The method of claim 27, wherein in step (f), in each cycle of the received video pixel clock signal the received pixel data is transmitted to a source terminal of the TFT of a liquid crystal device of the TFT LCD panel, the device on which the pixel data is to be displayed, and in each cycle of the received video line clock signal a predetermined driving voltage is input to a gate terminal of the TFT.

29. A computer readable medium having embodied thereon a computer program, said program performing the steps of:
(a) converting received analog source data into digital source data, and outputting the converted, received digital source data;
(b) generating an input detection signal containing information on the period from when analog source data is received to when conversion of the analog source data to digital source data is finished, and sending the input detection signal; and
(c) receiving the sent input detection signal, generating a predetermined clock, and based on information contained in the received input detection signal, during the period from when analog source data is received to when conversion of the analog source data to digital source data is finished, disabling the generated predetermined clock signal, and during a remaining period, releasing the disabling and sending the predetermined clock signal.

30. The computer readable medium of claim 29, wherein the digital source data is obtained by sampling predetermined digital data corresponding to the received analog source data.

31. The computer readable medium of claim 30, wherein the conversion is finished when the sampling is completed.

32. A computer readable medium having embodied thereon a computer program, said program performing the steps of:
(a) converting analog coordinate data received from a touch screen panel into digital coordinate data, and sending the converted, received digital coordinate data;
(b) generating and sending an input detection signal which is in a "high" logic level during a period from when analog coordinate data is received to when conversion of the analog coordinate data to digital coordinate data is finished and in a "low" logic level during a remaining period; and
(c) receiving the sent input detection signal, generating a video pixel clock signal commanding display of video pixels in each predetermined cycle and a video line clock signal commanding display of a video line in each cycle that is a multiple of the predetermined cycle by using the generated video pixel clock signal, and during a period from when the received input detection signal and the generated video line clock signal are in a "high" logic level to when the received input detection is transited to a "low" logic level, holding the state of the generated video pixel clock signal in a "low" logic level and sending the video line clock signal that is held in a "high" logic level as a result of holding the video pixel clock signal in a "low" logic level, and during a remaining period, releasing the holding and sending the video line clock signal.

33. The computer readable medium of claim 32, wherein the digital coordinate data is obtained by sampling predetermined digital data corresponding to the received analog coordinate data.

34. The computer readable medium of claim 33, wherein the analog coordinate data is converted into digital coordinate data when the sampling is finished.

35. The computer readable medium of claim 34, wherein in step (a) the converting begins when the received input detection signal is in a "high" logic level and the generated video line clock signal is in a "high" logic level.

36. A computer readable medium having embodied thereon a computer program, said program performing the steps of:
   (a) if a touch input is received on a touch screen panel, generating analog coordinate data indicating the coordinates of a location of said touch input and sending the data;
   (b) receiving the sent analog coordinate data, converting the received analog coordinate data into digital coordinate data, outputting the converted data, generating and transmitting an input detection signal at a "high" logic level during a period from when analog coordinate data is received to when conversion of the analog coordinate data to digital coordinate data is finished and is in a "low" logic level during a remaining period;
   (c) receiving the transmitted input detection signal, generating a video pixel clock signal commanding display of video pixels in each predetermined cycle and a video line clock signal commanding to display a video line in each cycle that is a multiple of the predetermined cycle, by using the generated video pixel clock signal, and during a period from when the received input detection signal and the generated video line clock signal are in a "high" logic level to when the received input detection is transited to a "low" logic level, holding a state of the generated video pixel clock signal in a "low" logic level and sending the video line clock signal that is held in a "high" logic level as a result of holding the video pixel clock signal in a "low" logic level, and during the remaining period, releasing the holding and sending the video line clock signal;
   (d) receiving the sent digital coordinate data, generating video data corresponding to the received digital coordinate data, and sending the video data;
   (e) receiving and storing the sent video data, receiving the sent video line clock signal and video pixel clock signal, sending predetermined pixel data among the stored video data in each cycle of the received video pixel, and sending the received video line clock signal and video pixel clock signal; and
   (f) receiving the sent pixel data, video pixel clock signal, and video line clock signal, inputting the received pixel data to a predetermined video display panel in each cycle of the received video pixel clock signal, and inputting a predetermined driving voltage to the video display panel in each cycle of the received video line clock signal so that a video is output.

37. The computer readable medium of claim 36, wherein the digital coordinate data is obtained by sampling predetermined digital data corresponding to the analog coordinate data.

38. The computer readable medium of claim 37, wherein the analog coordinate data is converted into digital coordinate data when the sampling is finished.

39. The computer readable medium of claim 38, wherein in step (b) converting into digital coordinate data begins when the received input detection signal is in a "high" logic level and the generated video line clock signal is in a "high" logic level.

40. The computer readable medium of claim 36, wherein the video display panel is a thin film transistor (TFT) liquid crystal display (LCD) panel.

41. The computer readable medium of claim 40, wherein the video pixel clock signal is a pulse that provides a cycle for switching a TFT of the TFT LCD panel.

42. The method of claim 41, wherein in step (f), in each cycle of the received video pixel clock signal the received pixel data is transmitted to a source terminal of the TFT of a liquid crystal device of the TFT LCD panel, the device on which the pixel data is to be displayed, and in each cycle of the received video line clock signal a predetermined driving voltage is input to a gate terminal of the TFT.

* * * * *